United States Patent
Tang et al.

(10) Patent No.: US 11,676,390 B2
(45) Date of Patent: Jun. 13, 2023

(54) MACHINE-LEARNING MODEL, METHODS AND SYSTEMS FOR REMOVAL OF UNWANTED PEOPLE FROM PHOTOGRAPHS

(71) Applicants: Qiang Tang, Burnaby (CA); Zili Yi, Burnaby (CA); Zhan Xu, Richmond (CA)

(72) Inventors: Qiang Tang, Burnaby (CA); Zili Yi, Burnaby (CA); Zhan Xu, Richmond (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 224 days.

(21) Appl. No.: 17/079,084

(22) Filed: Oct. 23, 2020

(65) Prior Publication Data

US 2022/0129682 A1 Apr. 28, 2022

(51) Int. Cl.
G06V 20/52 (2022.01)
G06T 7/11 (2017.01)
G06V 40/16 (2022.01)

(52) U.S. Cl.
CPC .............. G06V 20/53 (2022.01); G06T 7/11 (2017.01); G06V 40/162 (2022.01);
(Continued)

(58) Field of Classification Search
CPC . G06T 2207/30242; G06T 2207/20084; G06T 7/11; G06V 2201/07; G06V 40/162; G06V 40/172; G06V 20/53
See application file for complete search history.

(56) References Cited

U.S. PATENT DOCUMENTS

| 7,149,665 B2 * | 12/2006 | Feld | G06Q 30/02 703/2 |
| 8,208,722 B1 * | 6/2012 | Wolfram | G06T 15/80 382/167 |

(Continued)

FOREIGN PATENT DOCUMENTS

| CN | 1522425 | 8/2004 |
| CN | 107316020 | 11/2017 |

(Continued)

OTHER PUBLICATIONS

Kaiming He, Xiangyu Zhang, Shaoqing Ren, Jian Sun; "Deep Residual Learning for Image Recognition," The IEEE Conference on Computer Vision and Pattern Recognition (CVPR) 2016.

*Primary Examiner* — Mia M Thomas

(57) ABSTRACT

Methods and systems for fully-automatic image processing to detect and remove unwanted people from a digital image of a photograph. The system includes the following modules: 1) Deep neural network (DNN)-based module for object segmentation and head pose estimation; 2) classification (or grouping) of wanted versus unwanted people based on information collected in the first module; 3) image inpainting of the unwanted people in the digital image. The classification module can be rules-based in an example. In an example, the DNN-based module generates, from the digital image: 1. A list of object category labels, 2. A list of object scores, 3. A list of binary masks, 4. A list of object bounding boxes, 5. A list of crowd instances, 6. A list of human head bounding boxes, and 7. A list of head poses (e.g., yaws, pitches, and rolls).

19 Claims, 11 Drawing Sheets

(52) U.S. Cl.
CPC .. *G06V 40/172* (2022.01); *G06T 2207/20084* (2013.01); *G06T 2207/30242* (2013.01); *G06V 2201/07* (2022.01)

(56) References Cited

U.S. PATENT DOCUMENTS

| | | | | |
|---|---|---|---|---|
| 9,177,225 | B1* | 11/2015 | Cordova-Diba | G06F 16/583 |
| 10,540,757 | B1* | 1/2020 | Bouhnik | G06T 3/4084 |
| 11,157,131 | B2* | 10/2021 | Lee | G06F 3/0325 |
| 11,176,679 | B2* | 11/2021 | Lin | G06T 7/194 |
| 11,270,476 | B2* | 3/2022 | Chen | G06T 3/0093 |
| 11,288,884 | B2* | 3/2022 | Zhou | G06V 20/10 |
| 11,398,015 | B2* | 7/2022 | Lin | G06N 3/08 |
| 2005/0234782 | A1* | 10/2005 | Schackne | G06T 19/00 |
| | | | | 705/26.1 |
| 2014/0112548 | A1* | 4/2014 | Huang | G06T 5/005 |
| | | | | 382/108 |
| 2017/0061592 | A1* | 3/2017 | Reinhard | G06T 5/005 |
| 2017/0262991 | A1* | 9/2017 | Davidson | G06T 11/001 |
| 2019/0004533 | A1* | 1/2019 | Huang | G06V 20/56 |
| 2019/0114467 | A1* | 4/2019 | Liang | G06V 40/162 |
| 2019/0244407 | A1* | 8/2019 | Wiesel | G06V 40/103 |
| 2020/0183969 | A1* | 6/2020 | Wiesel | G06V 10/255 |
| 2021/0056348 | A1* | 2/2021 | Berlin | G06V 10/764 |
| 2021/0065448 | A1* | 3/2021 | Goodrich | G06F 3/0482 |

FOREIGN PATENT DOCUMENTS

| | | |
|---|---|---|
| CN | 109977781 | 7/2019 |
| CN | 110728270 | 1/2020 |

\* cited by examiner

MACHINE-LEARNING MODEL, METHODS AND SYSTEMS FOR REMOVAL OF UNWANTED PEOPLE FROM PHOTOGRAPHS

TECHNICAL FIELD

Example embodiments relate to image modification, for example image modification to remove unwanted humans from a photograph.

BACKGROUND

With the increasing popularity of smart phones, users take a number of photographs daily. It is common that photographs taken casually contain distracting or unwanted people, e.g., pedestrians, intruders, strangers. Traditionally, the removal of unwanted objects from a digital photograph requires manual editing of the photographs on a personal computer with graphics editing processing software, such as Adobe™ Photoshop. These types of graphics editing software are not fully automatic, and require users to manually select the regions or objects and edit or remove them from the photographs.

Some other existing image modification methods, such as Shan et al., "Photobomb Defusal Expert: Automatically Remove Distracting People From Photos", IEEE Transactions on Emerging Topics in Computational Intelligence, 3 Sep. 2018: 717-727, herein incorporated by reference, perform automatically by identifying and cropping distracting unwanted persons, therefore losing valuable background and image size from the original photograph.

Some other existing image modification methods, such as Kumara et al., "An Automatic Stranger Removal Photography System Using Panoramic Inpainting", J. Inf. Sci. Eng., 2015, 31(6): 1919-1935, herein incorporated by reference, process panoramic images and use a database to detect strangers, whose faces are not in a face database. The strangers are identified using a face identification algorithm. Segmentation is performed which produces the masks of distracting people. After strangers are removed, background information for inpainting is taken by dilating the mask a small distance around the identified stranger. Information from multiple source frames covering the same location of the panorama is used to inpaint the missing image data.

Yet some other existing image modification methods, such as Fried et al., "Finding Distractors in Images"; Proceedings of the IEEE Conference on Computer Vision and Pattern Recognition, June 2015: 1703-1712, incorporated herein by reference, identify distractors using small salient segments or elements such as blemishes, glare spots, dust, etc., which is limited to the editing parts of the head of the human and does not efficiently solve the problem of removing the entire human from the photograph.

It is desirable to provide an image modification method that can automatically detect, remove, and inpaint unwanted humans from a photograph.

SUMMARY

Example embodiments provide a digital image modification (or "image modification") method, device and system, to remove unwanted or distracting humans from a digital image of a photograph. The photograph can contain humans, non-human objects, and background. For example, the image modification method, device and system can be used to modify a digital image to remove and inpaint the unwanted humans from the digital image.

According to a first aspect, the method includes object segmenting and head pose estimating, classification (or grouping) of wanted versus unwanted humans using the object segmenting and the head pose estimating, and image inpainting of the unwanted humans in the digital image.

A technical effect of the image modification method of the present disclosure is that the entire image modification method can be performed automatically end-to-end, in which the digital image can be automatically processed to detect, remove, and inpaint the unwanted humans, as compared to manual methods. The image modification method can be automatically initiated on a portable device using a single or a few input commands, without onerous and impractical manual image manipulation.

Another technical effect of the image modification method of the present disclosure is that the method can be performed by a user equipment having a camera, and the image modification method can be initiated, automatically or manually, on the user equipment soon after capturing the digital image by the camera. The user equipment can be a portable user equipment or mobile user equipment.

Another technical effect of the image modification method of the present disclosure is that the same dimensions of the digital image are maintained, as cropping of the digital image to remove the unwanted human is not required.

Another technical effect of the image modification method of the present disclosure is that the entire unwanted human is removed and inpainted, not merely small salient segments or elements such as red eyes, blemishes, glare spots, dust, etc.

Another technical effect of the image modification method of the present disclosure is that the head pose of each human in the digital image is used for classifying wanted versus unwanted humans, causing improved accuracy and performance of the image modification method.

Another technical effect of the image modification method of the present disclosure is that the digital image can be inpainted without reference to other images, panoramic scenes, or video frames.

In an example embodiment of the first aspect, the image modification method includes identifying a main character (main human instance) from the digital image, the main character being one of the wanted humans. Additional humans in the digital image can be identified as being wanted versus unwanted based on their size and location relationship to the main character.

A technical effect of identifying the main character in the image modification method of the present disclosure and identifying the additional humans is that there is greater accuracy in the identifying of wanted versus unwanted humans in the digital image.

In another example embodiment of the first aspect, the method includes generating, using the image instance segmentation model, list of crowd instances contained in the digital image. For example, a crowd instance can be a group of humans at least greater than a threshold such as five humans. Determining whether the digital image has a crowd or not can be used by the method to make a different decision if the crowd contains too many humans, i.e., leave the bounding box as un-inpainted when the crowd is at least greater than five humans, rather than inpainting the entire crowd when there are less than five humans.

In another example embodiment of the first aspect, the method includes: receiving a digital image; generating, using an image instance segmentation model, a list of at least one human instance detected in the digital image, a respective bounding box for each human instance, and a respective object mask defined by respective pixels for each human instance; generating, using a head pose estimation model, a respective head pose for each human instance; classifying, using i) the list of at least one human instance, ii) the respective bounding box for each human instance, iii) the respective head pose for each human instance, the respective object mask for each human instance that is to be removed from the digital image versus the respective object mask for each human instance that is to be maintained in the digital image; and generating, using an inpainting model, an inpainted digital image from the digital image by inpainting the respective pixels of the respective classified object mask for each human instance that is to be removed.

In an example embodiment of any of the above, the respective head pose for each human instance includes yaw, pitch, and roll.

In an example embodiment of any of the above, the method further includes, using a head detection model, a respective bounding box for each human head instance detected in the digital image.

In an example embodiment of any of the above, the method further includes matching each human head instance to the human instance to which that human head instance belongs.

In an example embodiment of any of the above, the method further includes generating, using the image instance segmentation model, for each human instance: object category label, and object probability.

In an example embodiment of any of the above, the method further includes generating, using the image instance segmentation model, at least one non-human object instance detected in the digital image, the method further includes generating, using the image instance segmentation model, for each non-human object instance: object category label, object probability, object binary mask, and object bounding box, and wherein the generating, using the inpainting model, uses the object category label, the object probability, the object binary mask, and the object bounding box.

In an example embodiment of any of the above, for each non-human object instance detected in the digital image, a same non-human object category label is used.

In an example embodiment of any of the above, the method further includes generating, using the image instance segmentation model, a list of crowd instances contained in the digital image.

In an example embodiment of any of the above, each crowd instance in the list of crowd instances contain at least a threshold number of human instances in a region of interest.

In an example embodiment of any of the above, each crowd instance in the list of crowd instances define the respective masks of human instances that are to be maintained in the digital image.

In an example embodiment of any of the above, the classifying each human instance that is to be maintained in the digital image includes detecting a main human instance in the digital image, wherein the main human instance is one of the human instances that is highest, centered, front facing and horizontally complete.

In an example embodiment of any of the above, the classifying each human instance that is to be maintained in the digital image includes detecting at least one human instance in the digital image that is overlapped in a cluster with the main human instance.

In an example embodiment of any of the above, the classifying each human instance that is to be maintained in the digital image includes detecting at least two human instances in the digital image that are overlapped in a cluster exclusive of the main human instance and has a respective height within a threshold of the main human instance.

In an example embodiment of any of the above, the classifying includes detecting at least one human instance in the digital image that has feet located at a same level as the main human instance and has a respective height within a threshold of the main human instance.

In an example embodiment of any of the above, the method further includes computing a percentage of total image area of the respective object mask for each human instance that is to be removed from the digital image versus total image area of the digital image, and when the percentage exceeds a percentage threshold, refraining from performing the generating of the inpainted digital image.

In an example embodiment of any of the above, the generating, using the inpainting model, includes using the digital image without any other digital images.

According to a second aspect, an image modification system is provided, where the image modification system includes modules configured to perform the method in the first aspect.

In an example embodiment of the second aspect, the image modification system includes the following modules: 1) Deep neural network (DNN)-based object segmentation and head pose estimation; 2) wanted/unwanted human classification (or grouping) of wanted versus unwanted people based on information collected in the first module; 3) DNN-based image inpainting of the unwanted people in the digital image. In an example embodiment, the wanted/unwanted human classification module is rules based. In an example embodiment, the wanted/unwanted human classification module is neural network or DNN based.

In an example embodiment of the second aspect, the first module generates, from the digital image: 1. A list of object category labels, 2. A list of object scores, 3. A list of binary masks, 4. A list of object bounding boxes, 5. A list of crowd instances (i.e., is_crowd flags), 6. A list of human head bounding boxes, and 7. A list of head poses (e.g., yaws, pitches, and rolls). A bounding box is a rectangle identified for the digital image that represents a particular region of interest (ROI).

According to a third aspect, an image modification apparatus is provided, where the image modification apparatus includes: a memory, configured to store a program; a processor, configured to execute the program stored in the memory, and when the program stored in the memory is executed, the processor is configured to perform the method in the first aspect. In an example embodiment of the third aspect, the image modification apparatus is a user equipment.

According to a fourth aspect, a computer readable medium is provided, where the computer readable medium stores program code executed by the image modification apparatus, and the program code performs the method in the first aspect when executed by at least one processor of the image modification apparatus.

According to a fifth aspect, a computer program product including instructions is provided. When the computer program product is run on a computer, the image modification apparatus performs the method in the first aspect.

According to a sixth aspect, a computer chip is provided, where the computer chip includes a processor and a data interface, and the processor reads, by using the data interface, instructions stored in a memory, to perform the method in the first aspect.

Optionally, in an implementation, the computer chip may further include the memory. The memory stores the instructions, and the processor is configured to execute the instructions stored in the memory. When the instructions are executed, the processor is configured to perform the method in the first aspect.

BRIEF DESCRIPTION OF THE DRAWINGS

Reference will now be made, by way of example, to the accompanying drawings which show example embodiments, and in which.

Similar reference numerals may have been used in different figures to denote similar components.

DETAILED DESCRIPTION

Figure 1:
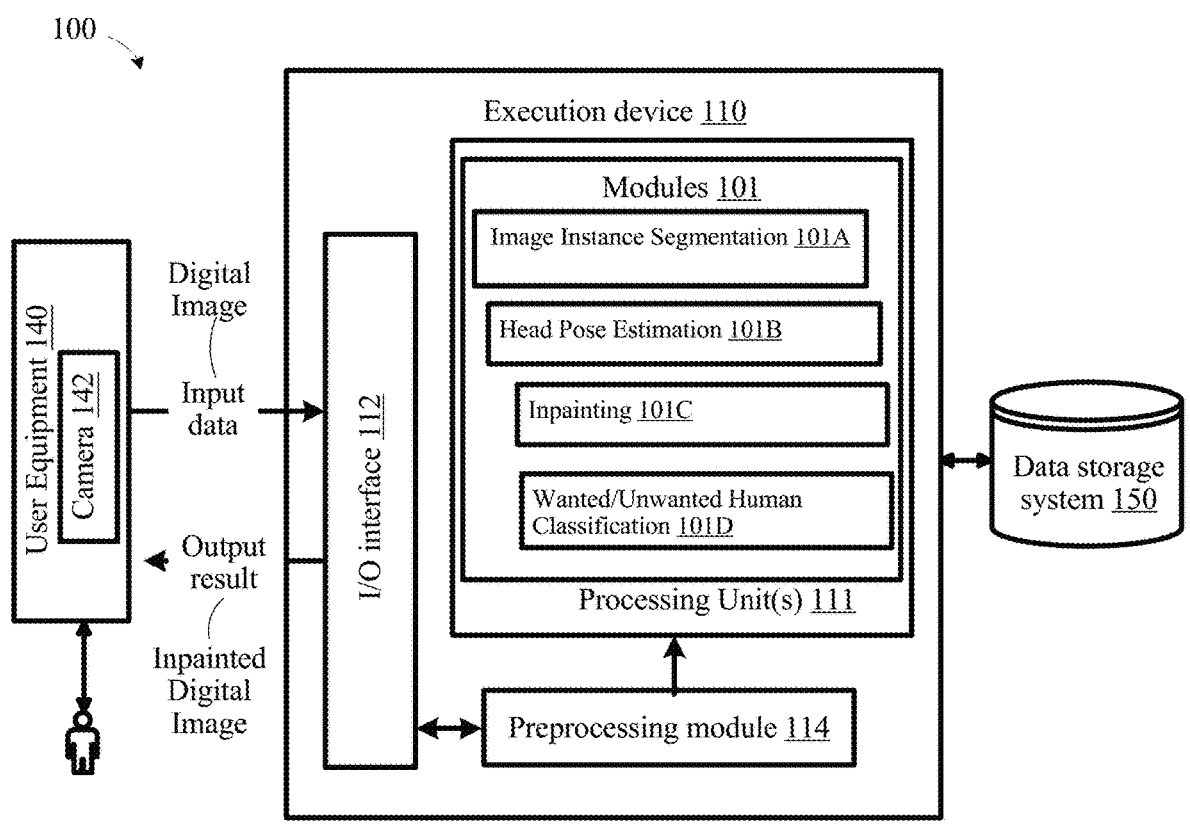
FIG. 1 is a schematic structural diagram of a system architecture of an image modification system, in accordance with an example embodiment.

The following describes technical solutions of example embodiments with reference to accompanying drawings.

The following definitions and variables are referenced herein:

TABLE 1

| | |
|---|---|
| W, H | Image width/height in pixels |
| $x_{ic}$ | Image horizontal center |
| $x_0, y_0, x_1, y_1$ | top-left and bottom-right corners |
| $P_y$ | Person feet position relative to the image height $y_1/H$ |
| $P_c$ | Person centrality relative to image center |
| $P_h$ | Person height, maximum $y_1$ minus minimum $y_0$ |
| $M_h$ | The height of the union of all the main characters after grouping |
| is_front | Indicated whether a head is considered to be frontal |
| is_complete | is_complete is false if the bounding box is on the image boundary |
| $P_{score}$ | The character relevance score, highest of which denotes the main character. |

TABLE 1-continued

The terms person and human are used interchangeably herein.

An example embodiment is a user equipment configured to execute an image modification method which removes unwanted or distracting humans from a digital image of a photograph. The photograph can contain humans, non-human objects, and background. For example, the image modification method can be used to modify the digital image to remove and inpaint the unwanted humans from the digital image.

The image modification method automatically processes the digital image, and is able to detect, remove, and inpaint the unwanted humans, without requiring manual intervention.

The image modification method provided in example embodiments can be applied to a first example scenario in which a digital image of a digital image is desired to be modified in order to remove unwanted humans. A digital image is received by the user equipment, for example by using an on-board camera to capture a photograph or by accessing an image file of the digital image from memory of the user equipment. The method processes the digital image and detects humans from the digital image. The method classifies which humans are wanted versus unwanted in the digital image. The method inpaints the unwanted humans so that those unwanted humans are removed, and generates an inpainted digital image. The method outputs the inpainted digital image.

Therefore, a technical effect is that a digital image can be modified by automatically substituting, for unwanted or distracting foreground humans, approximate background textures that do not draw attention from the wanted human(s) in the digital image.

In an example, the method includes object segmentation and head pose estimation, classifying of wanted versus unwanted humans using the object segmentation and the head pose estimation, and image inpainting of the unwanted humans in the digital image.

A technical effect of the image modification method is that the head pose estimating in the digital image is used for classifying wanted versus unwanted humans, causing improved accuracy in generating a photograph in which unwanted humans have been inpainted with background.

The image modification method provided in example embodiments can be applied to a second example scenario in which the digital image is remotely stored in remote storage such as a server, or cloud storage associated with a user account, such as a user's social media account. The method retrieves the remotely stored digital image, generates an inpainted digital image, and outputs the inpainted digital image to the remote storage or to the user equipment for rendering on a display screen of the user equipment.

FIG. 1 illustrates a system architecture of an image modification system 100 in accordance with an example embodiment. One or more processing unit(s) 111 can include a host CPU and other processing units (a Neural Processing Unit (NPU), a tensor processing unit (TPU), a graphics processing unit (GPU), or the like). The processing unit(s) 111 execute modules 101, which include image instance segmentation module 101A, head pose estimation module 101B, an inpainting module 101C, and a wanted/unwanted human classification module 101D.

The modules 101 can be used to implement aspects of the image modification method (FIG. 4) according to an example embodiment. The input to the modules 101 can be a digital image of a photograph which contains one or more humans. The digital image can be received from the user equipment 140.

In an example, the modules 101 each include a trained model. By way of example, the trained image instance segmentation module 101A can include a trained image instance segmentation model, the head pose estimation module 101B can include a trained head pose estimation model, and the inpainting module 101C can include a trained inpainting model.

As shown in FIG. 1, the modules 101 can include the image instance segmentation module 101A which is configured to generate a list of at least one human instance detected in the digital image, a respective bounding box for each human instance, and a respective object mask defined by respective pixels for each human instance. A bounding box is a rectangle identified for the digital image that represents a ROI.

In an example implementation, the image instance segmentation module 101A generates, from the digital image: 1. A list of object category labels, 2. A list of object scores, 3. A list of binary masks, 4. A list of object bounding boxes, 5. A list of crowd instances. In some examples, the image instance segmentation module 101A generates a segmented image (not shown here) of the digital image in which each object instance has a unique individual color.

Figure 8:
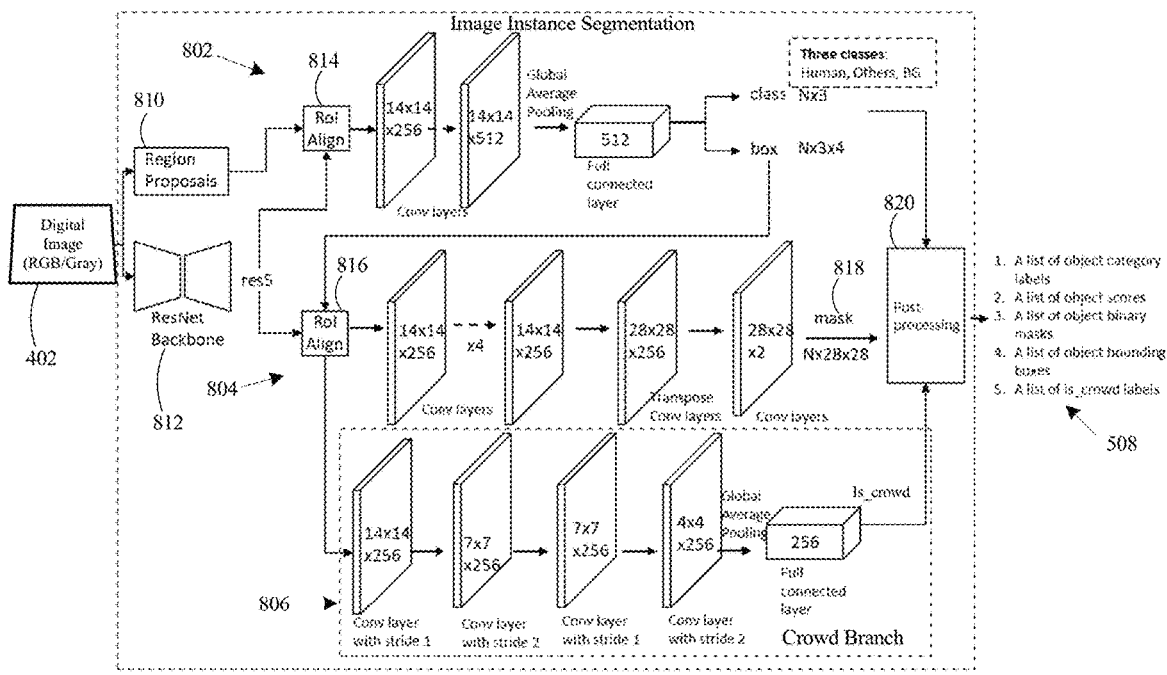
FIG. 8 is a detail flow diagram performed by the image instance segmentation module of the first module, in accordance with an example embodiment.

In an example, the trained image instance segmentation module 101A can include an image instance segmentation model. An example trained image instance segmentation model of the image instance segmentation module 101A is illustrated in FIG. 8, and is described in greater detail herein below. The image instance segmentation module 101A can include a deep neural network (DNN).

As shown in FIG. 1, the modules 101 can include a head pose estimation module 101B. The head pose estimation module 101B includes a neural network model configured to generate, from the digital image: 6. A list of human head bounding boxes, and 7. A list of head poses (e.g., yaws, pitches, and rolls).

Figure 9:
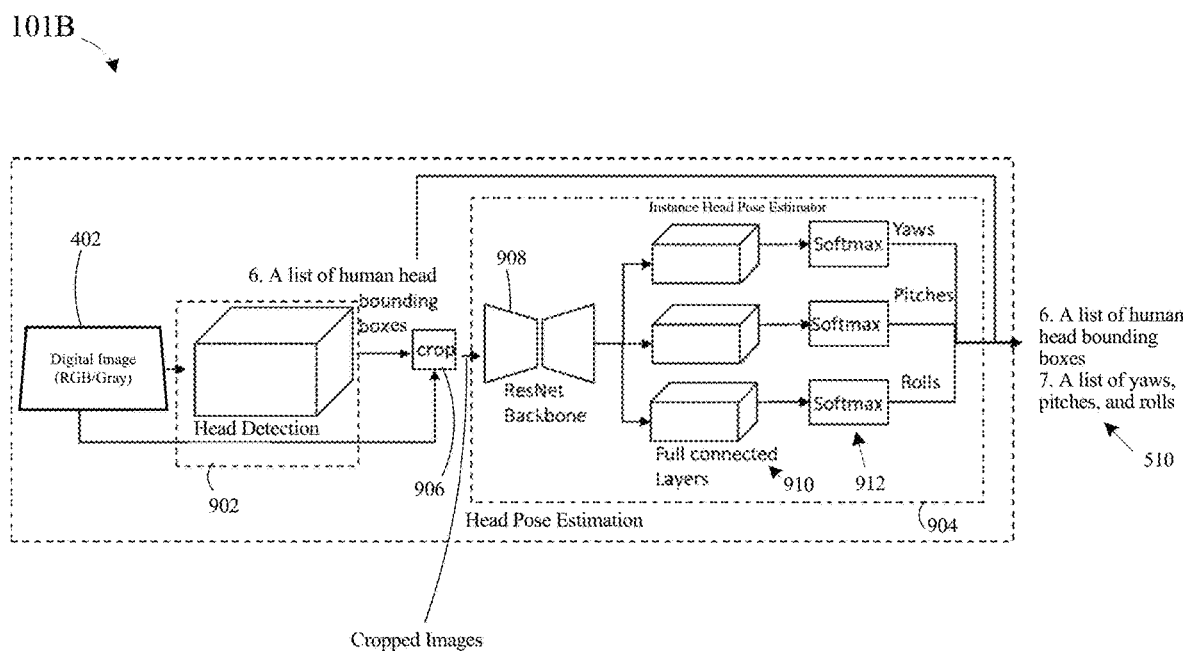
FIG. 9 is a detail flow diagram performed by the head pose estimation module of the first module, in accordance with an example embodiment.

The head pose estimation module 101B can include a trained head pose estimation model. An example of the head pose estimation model of the head pose estimation module 101B is illustrated in FIG. 9, and is described in greater detail herein below.

The wanted/unwanted human classification module 101D is configured to classify the human instances into wanted versus unwanted. For example, distracting humans are unwanted. The unwanted human classification module 101D is configured to generate a list of the unwanted human masks and the list of masks of the unwanted human instances.

Figure 10:
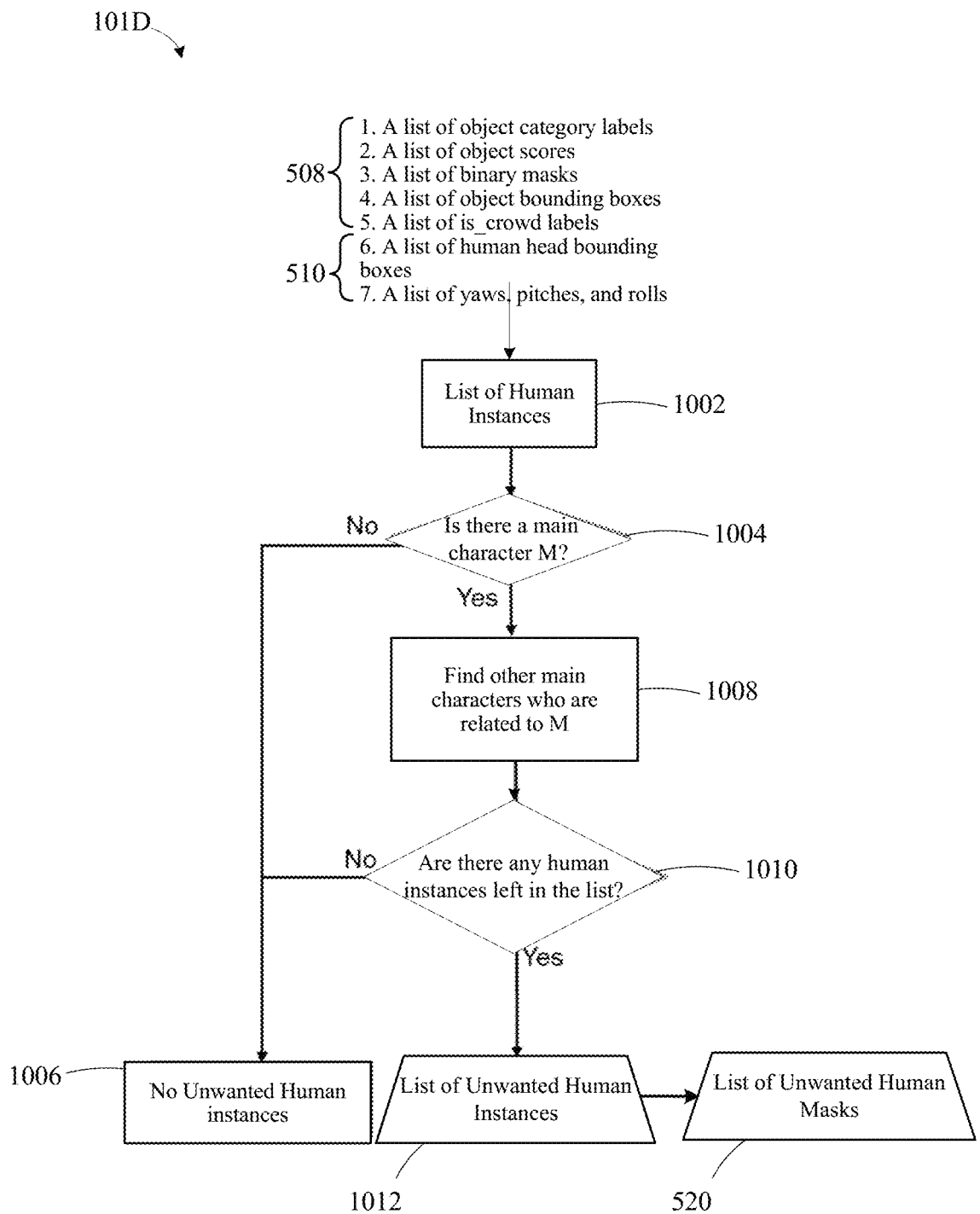
FIG. 10 is a detail flow diagram performed by a wanted/unwanted human classification module of the image modification system for classifying unwanted humans versus wanted humans from the digital image, in accordance with an example embodiment.

In an example, the wanted/unwanted human classification module 101D includes a set of rules for classifying the human instances into wanted versus unwanted. In another example, the wanted/unwanted human classification module 101D can include a wanted/unwanted human classification model. In an example, the wanted/unwanted human classification module 101D includes a deep neural network that is trained to classify the human instances into wanted versus unwanted. For example, labelled data for the training of the deep neural network can include: a digital image, and an identification of which humans are wanted and which humans are unwanted in the digital image. From the labelled data, the wanted/unwanted human classification model is trained to identify which humans are wanted and which humans are unwanted. In another example, the wanted/unwanted human classification model includes equations or rules having configurable constants that are learned in order to identify wanted/unwanted humans. For example, the value of the height of the human within the digital image, the person centrality of the human within the digital image, or the head pose of the human in the digital image can be learned constants by the wanted/unwanted human classification model to identify which humans are wanted and which humans are unwanted. An example of the wanted/unwanted human classification module 101D is illustrated in FIG. 10, and is described in greater detail herein below.

As shown in FIG. 1, the modules 101 can include an image inpainting module 101C. In an example, the image inpainting module 101C is configured to generate, using the masks of the unwanted human instances and the digital image, an inpainted digital image that has the unwanted human instances inpainted. The image inpainting module 101C can include a trained image inpainting model, described in greater detail herein below in relation to FIG. 1. The trained image inpainting model can include a DNN.

In FIG. 1, the execution device 110 includes a network interface 112 for communicating with the user equipment using a communication protocol to receive photographs from the user equipment and to send inpainted photographs to the user equipment, which is configured to perform data interaction with a user equipment 140. A user may input data to the user equipment 140 which is then communicated to the I/O interface 112 using wired or wireless communication. In another example, the execution device 110 is part of the user equipment, and the user may input data over the I/O interface 112 to the execution device 110. In an example, the user equipment 140 includes a camera 142. In an example embodiment, the input data may include: a digital image generated (captured) by the camera 142 of the user equipment 140. In example embodiments, the digital image is retrieved from the execution device 110 itself, the user equipment 140 itself, a different user equipment device, a cloud server, an Internet Protocol (IP) address, an externally accessed user account, an externally accessed social media account, or digital images from the World Wide Web, etc.

In an optional example, a preprocessing module 114 is configured to perform preprocessing based on the input data (for example, the digital image) received from the user equipment 140 via the I/O interface 112. In a related processing process in which the preprocessing module 114 performs preprocessing on the input data or the processing unit(s) 111 in the execution device 110 performs computation, the execution device 110 may invoke data, code, or the like from a data storage system 150, to perform corresponding processing, or may store, in a data storage system 150, data, an instruction, or the like obtained through corresponding processing. In some examples, there is no preprocessing module 114 and preprocessing is not performed on the digital image.

The processing unit(s) 111 returns a processing result, for example, the inpainted digital image file in which the unwanted human instances are removed and inpainted, and the execution device 110 provides the processing result to the user equipment 140 via the I/O interface 112. The processing result can be the image file itself (e.g., in native or compressed file format), or an identifier or an address of where to retrieve the inpainted digital image file.

In the embodiment shown in FIG. 1, the user may use the camera 142 of the user equipment 140 to capture the digital image. The user equipment 140 then transmits an image file that contains the digital image to the execution device 110 via the I/O interface 112. In another case, the user equipment 140 may transmit to execution device 110, via the I/O interface 112, an identification of the image file that contains the digital image and causing the image file containing digital image to be retrieved by the execution device 110 via I/O interface 112 (e.g. the user equipment 140 sending an identifier or an address of where to retrieve the image file of the digital image).

In an example, each of the modules 101 can include a DNN. The DNN can also be referred to as a multi-layer neural network and may be understood as a neural network that includes a first layer (generally referred to as an input layer), a plurality of hidden layers, and a final layer (generally referred to as an output layer).

The DNN can be implemented by a Convolutional Neural Network (CNN), which is a deep neural network with a convolutional structure. The convolutional neural network includes a feature extractor consisting of a convolutional layer and a sub-sampling layer. The feature extractor may be considered as a filter. A convolution process may be considered as performing convolution on an image or a convolutional feature map (feature map) by using a trainable filter. The convolutional layer indicates a layer of neurons at which convolution processing is performed on an input in the convolutional neural network. At the convolutional layer of the convolutional neural network, one neuron may be connected only to neurons at some neighboring layers. One convolutional layer usually includes several feature maps, and each feature map may be formed by some neurons arranged in a rectangle. Neurons at a same feature map share a weight. The shared weight herein is the convolutional kernel. The shared weight may be understood as being unrelated to a manner and a position of image information extraction. A hidden principle is that statistical information of a part of an image is the same as that of another part. This indicates that image information learned in a part may also be used in another part. A plurality of convolutional kernels may be used at a same convolutional layer to extract different image information. Generally, a larger quantity of convolutional kernels indicates that richer image information is reflected by a convolution operation.

It should be noted that FIG. 1 is merely a schematic diagram of a system architecture of the image modification system 100 according to an example embodiment. Position relationships between the execution device 110, the user equipment 140, the processing unit(s) 111, the preprocessing module 114, and the like that are shown in FIG. 1 do not constitute any limitation. For example, the data storage system 150 is an external memory relative to the execution device 110. In another example, the data storage system 150 may be part of (i.e. located in) the execution device 110.

As shown in FIG. 1, in some examples, parts of the image instance segmentation module 101A may be obtained through libraries, such as category label libraries that provide category labels of particular images or particular object instances. Similarly, parts of the head pose estimation module 101B may be obtained through libraries.

Figure 2:
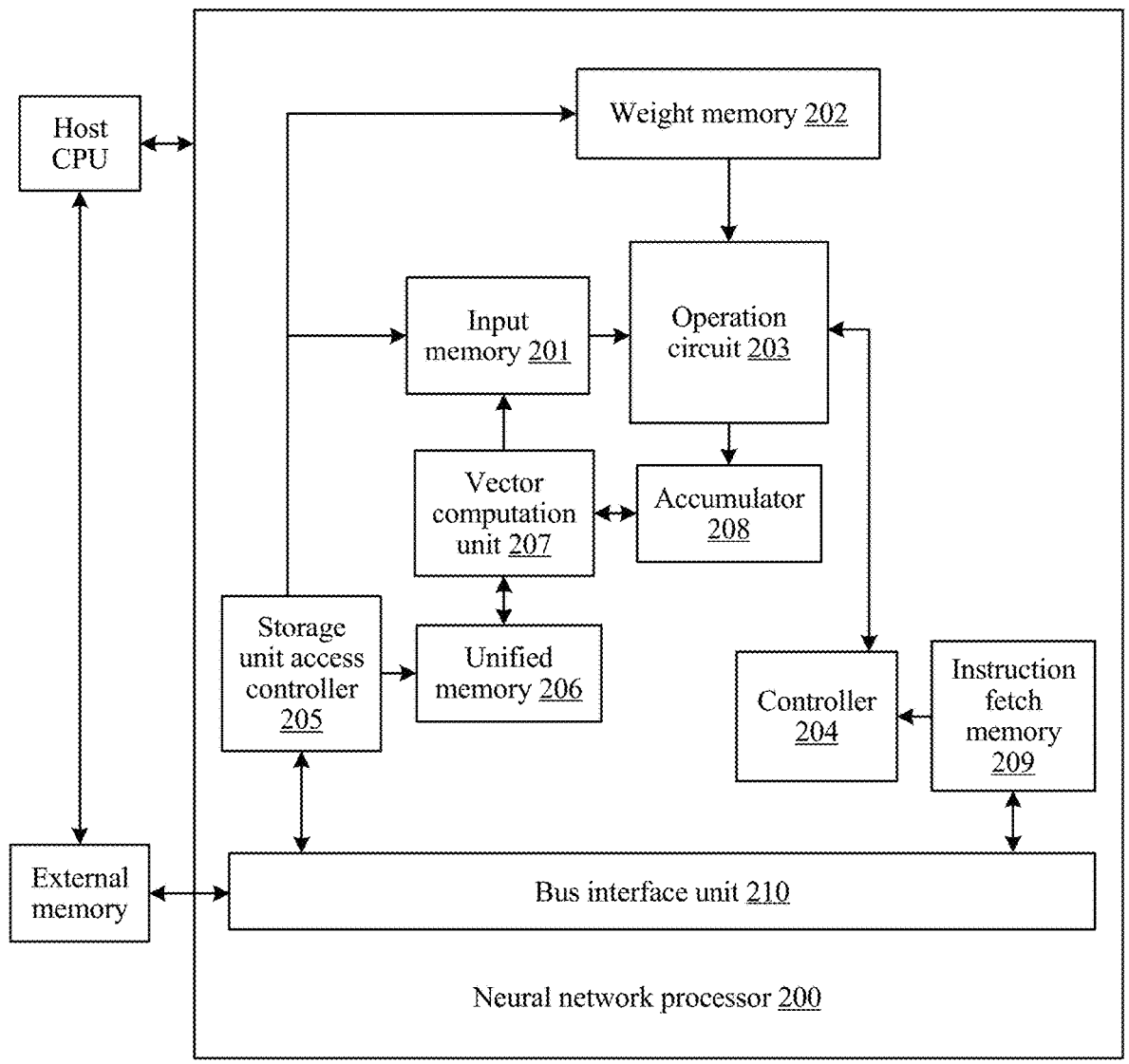
FIG. 2 is a schematic diagram of a hardware structure of a chip according to an example embodiment of the image modification system.

FIG. 2 shows a block diagram of a neural network processor 200 implemented in the execution device according to an example embodiment. The computer chip may be provided in the execution device 110 shown in FIG. 1, to perform computations of the models of the image modification system 100. The processing unit(s) 111 (FIG. 1) can include a host CPU and the neural network processor 200.

The neural network processor 200 may be any processor that is applicable to neural network computations, for example, a Neural Processing Unit (NPU), a tensor processing unit (TPU), a graphics processing unit (GPU), or the like. The NPU is used as an example. The NPU may be mounted, as a coprocessor, to the host CPU (Host CPU), and the host CPU allocates a task to the NPU. A core part of the NPU is an operation circuit 203. A controller 204 controls the operation circuit 203 to extract matrix data from memories (201 and 202) and perform multiplication and addition operations.

In some implementations, the operation circuit 203 internally includes a plurality of processing units (Process Engine, PE). In some implementations, the operation circuit 203 is a bi-dimensional systolic array. In addition, the operation circuit 203 may be a uni-dimensional systolic array or another electronic circuit that can implement a mathematical operation such as multiplication and addition. In some implementations, the operation circuit 203 is a general matrix processor.

For example, it is assumed that there are an input matrix A, a weight matrix B, and an output matrix C. The operation circuit 203 obtains, from a weight memory 202, weight data of the matrix B, and caches the data in each PE in the operation circuit 203. The operation circuit 203 obtains input data of the matrix A from an input memory 201, and performs a matrix operation based on the input data of the matrix A and the weight data of the matrix B. An obtained partial or final matrix result is stored in an accumulator (accumulator) 208.

A unified memory 206 is configured to store input data and output data. Weight data is directly moved to the weight memory 202 by using a storage unit access controller 205 (Direct Memory Access Controller, DMAC). The input data is also moved to the unified memory 206 by using the DMAC.

A bus interface unit (BIU, Bus Interface Unit) 210 is used for interaction between the DMAC and an instruction fetch memory 209 (Instruction Fetch Buffer). The bus interface unit 210 is further configured to enable the instruction fetch memory 209 to obtain an instruction from an external memory, and is further configured to enable the storage unit access controller 205 to obtain, from the external memory, source data of the input matrix A or the weight matrix B.

The DMAC is mainly configured to move input data from an external memory Double Data Rate (DDR) to the unified memory 206, or move the weight data to the weight memory 202, or move the input data to the input memory 201.

A vector computation unit 207 includes a plurality of operation processing units. If needed, the vector computation unit 207 performs further processing, for example, vector multiplication, vector addition, an exponent operation, a logarithm operation, or magnitude comparison, on an output from the operation circuit 203. The vector computation unit 207 is mainly used for computation at a non-convolutional layer or fully-connected layers (FC, fully connected layers) of a neural network, and specifically, may perform processing on computation such as pooling (pooling) or normalization (normalization). For example, the vector computation unit 207 may apply a nonlinear function to an output of the operation circuit 203, for example, a vector of an accumulated value, to generate an activation value. In some implementations, the vector computation unit 207 generates a normalized value, a combined value, or both a normalized value and a combined value.

In some implementations, the vector computation unit 207 stores a processed vector to the unified memory 206. In some implementations, the vector processed by the vector computation unit 207 may be used as activation input to the operation circuit 203, for example, to be used in a following layer of the neural network.

The instruction fetch memory 209 (Instruction Fetch Buffer) connected to the controller 204 is configured to store an instruction used by the controller 204.

The unified memory 206, the input memory 201, the weight memory 202, and the instruction fetch memory 209 are all on-chip memories. The external memory is independent from the hardware architecture of the NPU.

Figure 3:
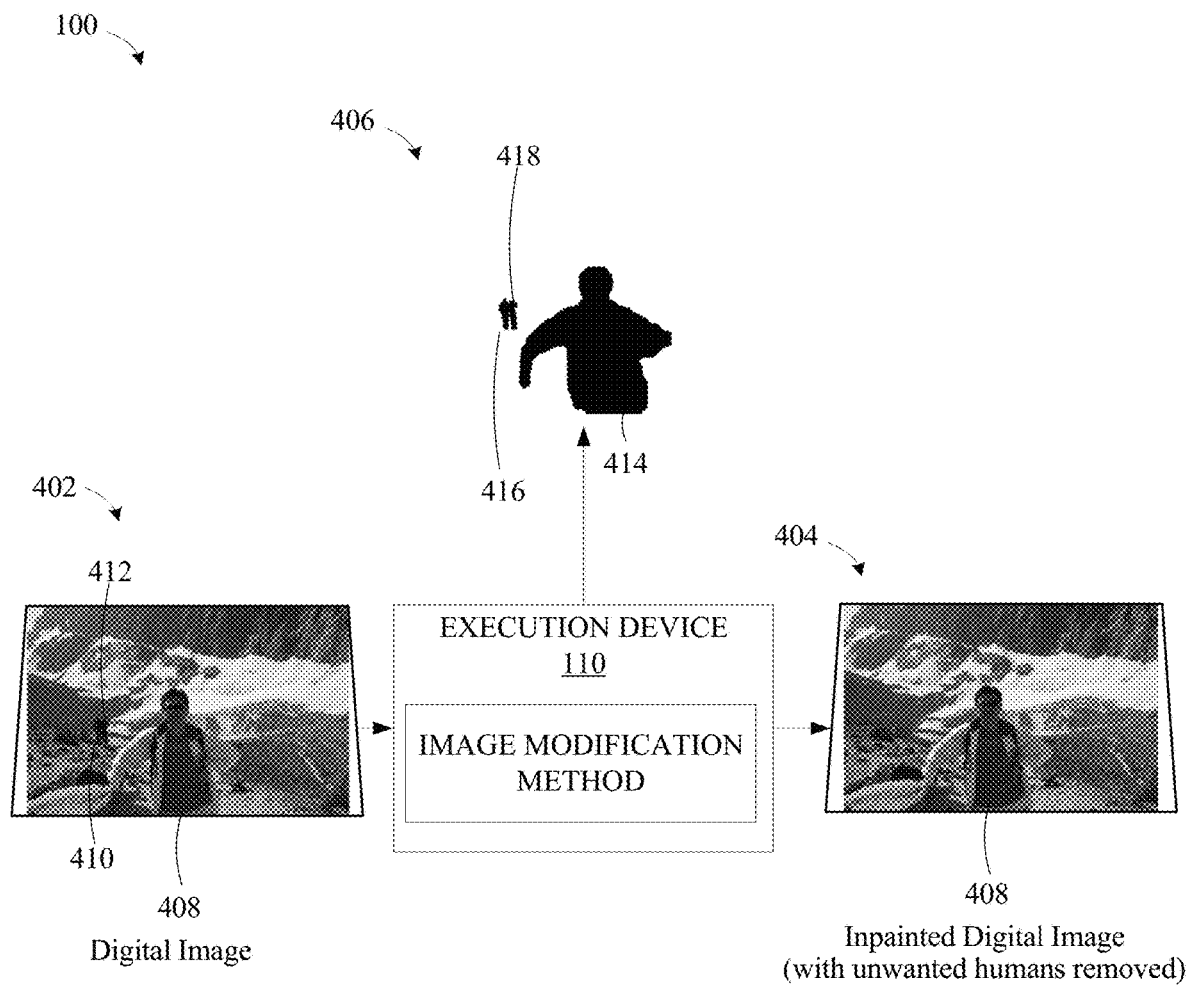
FIG. 3 is a pictorial representation of the image modification system, in accordance with an example embodiment.

FIG. 3 illustrates an example of the image modification system 100 which is configured to perform the image modification method, according to an example embodiment. The image modification method may be specifically performed by the image instance segmentation module 101A, the head pose estimation module 101B, the wanted/unwanted human classification module 101D, and the image inpainting module 101C of the execution device 110 shown in FIG. 1. The execution device 110 executes the image modification method. The image modification method starts with receiving the digital image 402. An image file containing the digital image 402 in the image modification method may be the input data provided by the user equipment 140 shown in FIG. 1. The inpainted digital image 404 is output by the image modification method in which unwanted human instances are removed and inpainted.

The digital image 402 includes, as objects that may be identified, first human 408, second human 410, and third human 412. In the present example, the first human 408 is classified as a wanted human instance, meaning the first human 408 is to be maintained in the digital image. In some examples, the first human 408 is identified by the execution device 110 as a main character (main human instance) in the digital image 402. The first human 408 is centered in the digital image and is facing frontward. The second human 410 and the third human 412 are classified as unwanted human instances, meaning they are to be removed and inpainted from the digital image 402. The second human 410 and the third human 412 are a much smaller size than the first human, are off-center in the digital image 402, and are facing away. In some examples, additional objects and background objects of the digital image 402 are also identified.

The image instance segmentation module 101A of the execution device 110 generates a mask 406 for each respective human instance, in this example first mask 414 for first human 408, second mask 416 for second human 410, and third mask 418 for third human 412. In some examples, the execution device 110 generates a mask for the additional objects and the background objects of the digital image 402.

The image instance segmentation module 101A of the execution device 110 generates a bounding box (not shown here) for each respective human instance and a bounding box (not shown here) for each detected human head instance. In some examples, the execution device 110 generates a bounding box (not shown here) for the additional objects and the background objects of the digital image 402.

The wanted/unwanted human classification module 101D of the execution device 110 classifies the human instances as being wanted versus unwanted. For the unwanted human instances, the wanted/unwanted human classification module 101D generates a list of the masks of the unwanted human instances, in this example the second mask 416 for second human 410, and third mask 418 for third human 412.

The image inpainting module 101C of the execution device 110 received the list of masks of the unwanted human instances, and generates an inpainted digital image 404, which is inpainting the second mask 416 (of the second human 410) and the third mask 418 (of the third human 412) of the digital image 402. In example embodiments, the execution device 110 uses the background objects and the additional objects for the inpainting. As shown in FIG. 3, the first human 408 is maintained in the inpainted digital image 404.

Figure 4:
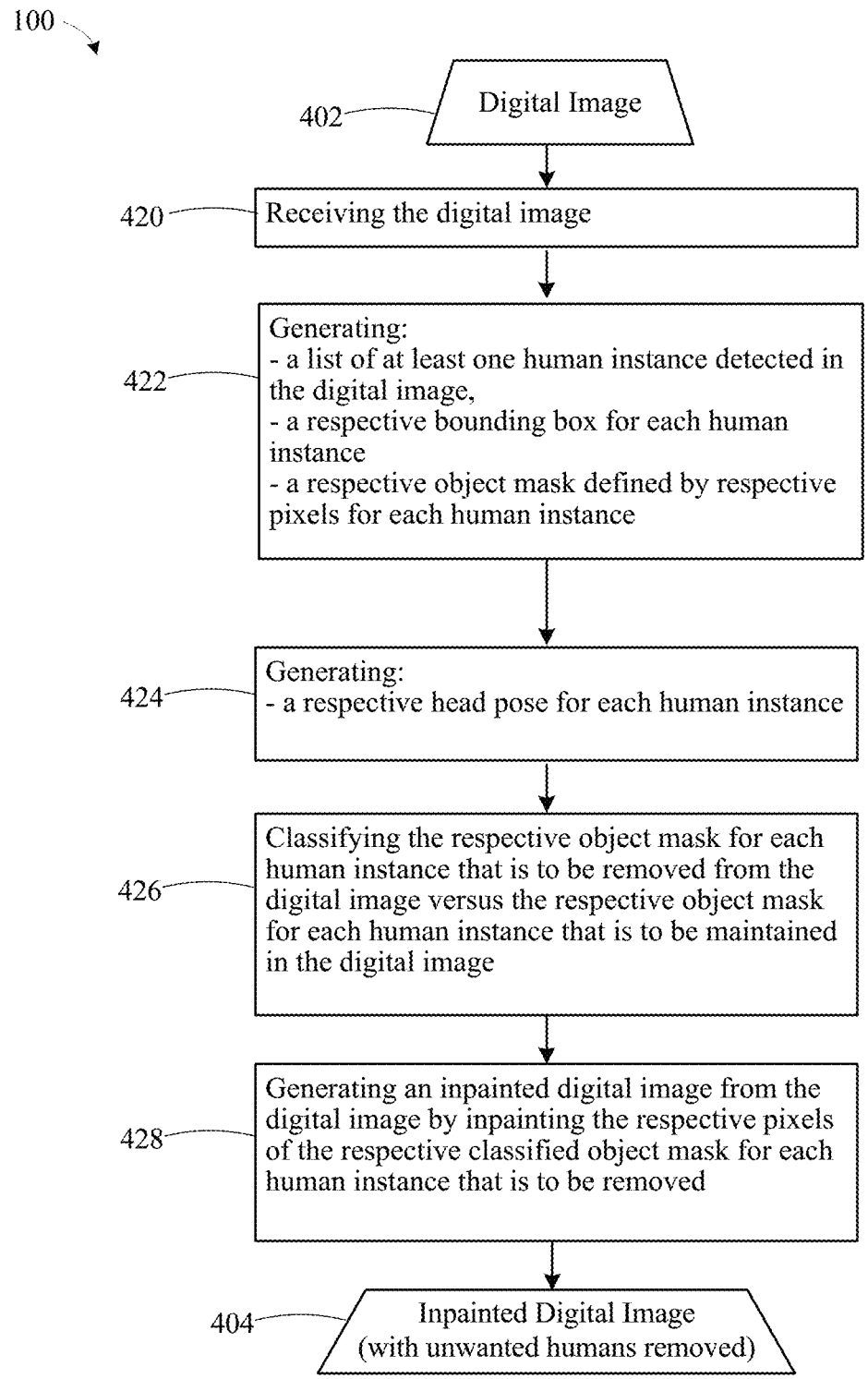
FIG. 4 is an example image modification method performed by the image modification system, in accordance with an example embodiment.

FIG. 4 is an example image modification method performed on a digital image 402 by the image modification system 100, according to an example embodiment. The image modification method may be carried out by modules, routines, or subroutines of software executed by the processing unit(s) 111 of the execution device 110 or by the processing units of the user equipment 140. Coding of software for carrying out the steps of image modification method is well within the scope of a person of ordinary skill in the art having regard to the described image modification method. The image modification method may contain additional or fewer steps than shown and described, and the steps may be performed in a different order. Computer-readable instructions executable by the processor(s) of the execution device 110 or the user equipment 140 may be stored in memory of the execution device or the user equipment 140, or a computer-readable medium. It is to be emphasized that the steps of the image modification method need not be performed in the exact sequence as shown, unless otherwise indicated; and likewise various steps of the image modification method may be performed in parallel rather than in sequence.

The image modification method begins at step 420 where the execution device 110 or the user equipment 140 receives the digital image 402.

The digital image 402 is a photograph which can contain humans, non-human objects, and background. A pixel value of the digital image 402 may be a red, green, and blue (RGB) color value. The pixel value may be a long integer indicating a color. For example, a pixel value is 255*Red+100*Green+76*Blue, where Blue represents a bit shift of a blue component, Green represents a bit shift of a green component, and Red represents a bit shift of a red component. 255, 100, and 76 are the respective coefficients of Red, Green, and Blue. In a 24-bit color representation, Red is shifted by 16 bits (65,536) and Green is shifted by 8 bits (256), and Blue is shifted by 0 bits (1). In all the color components, a smaller coefficient indicates lower brightness, and a larger coefficient indicates higher brightness. For a grayscale image, the pixel value may be a grayscale value (e.g., 0 to 255). For a black and white image, the pixel value may be a binary value such as 0 and 1, or 0 and 255. In some examples, a mask image generated from the digital image 402, in which the mask image is a representation of one or more particular objects in the digital image 402 in which pixels of a particular object are filled in a single color, e.g. black or gray, and the remaining pixels are white.

At step 422, the execution device 110 generates, using the image instance segmentation module 101A: a list of at least one human instance detected in the digital image 402, a respective bounding box for each human instance, and a respective object mask defined by respective pixels for each human instance. At step 424, the execution device 110 generates, using the head pose estimation module 101B: a respective head pose for each human instance. At step 426, the execution device 110 classifies, using i) the list of at least one human instance, ii) the respective bounding box for each human instance, iii) the respective head pose for each human instance: the respective object mask for each human instance that is to be removed from the digital image 402 versus the respective object mask for each human instance that is to be maintained in the digital image 402. At step 428, the execution device 110 generates, using the inpainting module 101C: an inpainted digital image 404 from the digital image 402 by inpainting the respective pixels of the respective classified object mask for each human instance that is to be removed.

In an example, the execution device 110 outputs the inpainted digital image 404. In some examples, the user equipment 140 displays the inpainted photograph on a display screen. In some examples, the user equipment 140 displays both the original digital image and the inpainted digital image side-by-side on the display screen. In some examples, the inpainted photograph is stored as a new image file. In some examples, the inpainted photograph is stored as an image file by overwriting the original image file that was the input digital image.

Figure 5:
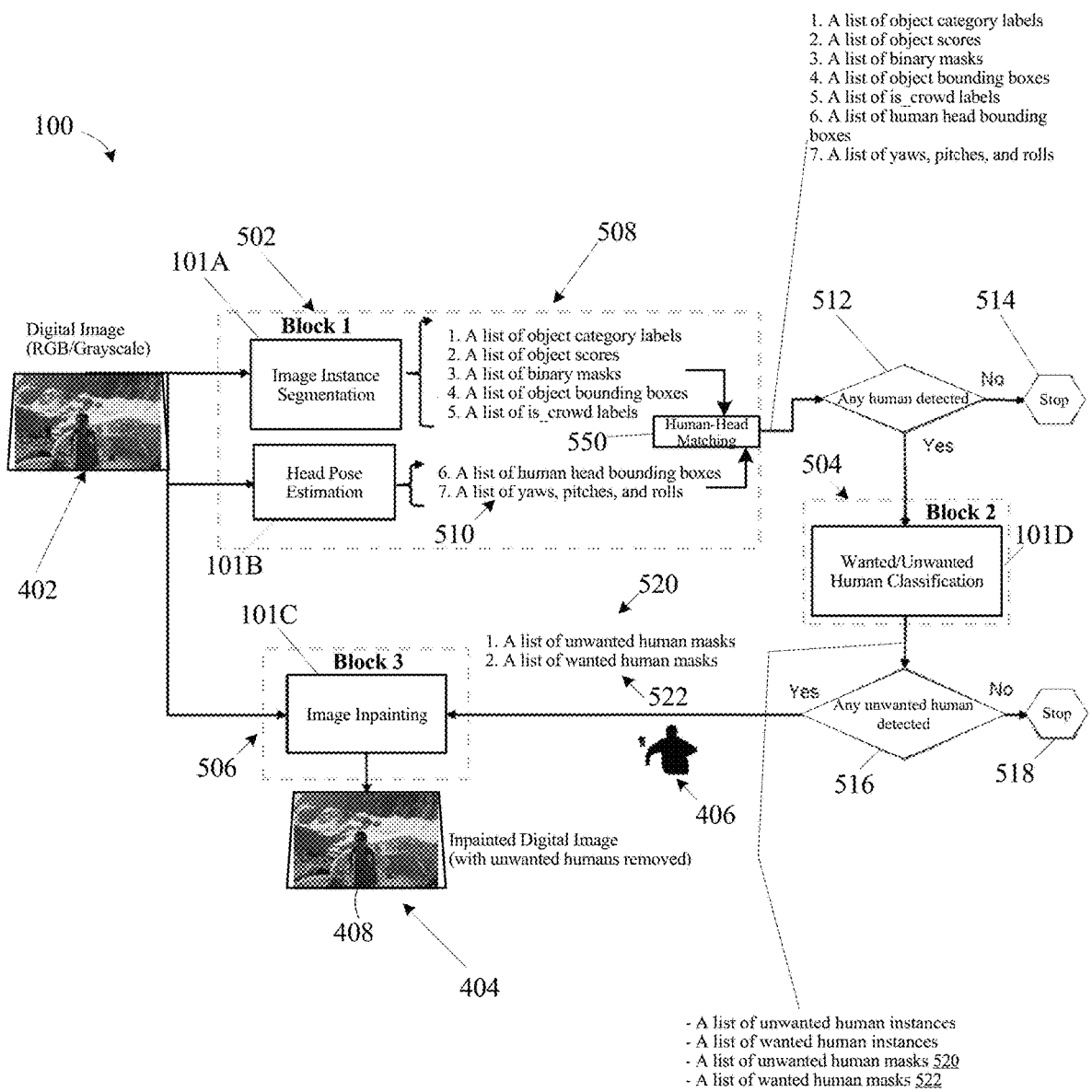
FIG. 5 is a detail flow diagram performed by the image modification system, in accordance with an example embodiment.

FIG. 5 is a detail flow diagram of the image modification method performed by the image modification system 100 in accordance with an example embodiment. The image modification system 100 can be configured to execute the following blocks: first block 502 (Block 1), second block 504 (Block 2), and third block 506 (Block 3). The input to the image modification system 100 is the digital image 402, which can be in color (RGB) or grayscale. The first block 502 includes the image instance segmentation module 101A and the head pose estimation module 101B and is configured to perform object segmentation and head pose estimation to generate object instance lists 508 and human head instance lists 510. The second block 504 includes the wanted/unwanted human classification module 101D which configured to perform wanted/unwanted human classification (or grouping) of wanted versus unwanted people based on object instance lists 508 and human head instance lists 510 generated by the first block 502. The third block 506 includes the image inpainting module 101C which is configured to perform image inpainting of the unwanted people in the digital image 404. The image inpainting module 101C generates the inpainted digital image 404 with the unwanted humans removed, which is then output by the image modification system 100. The inpainted digital image can be the same color or grayscale as the input digital image 402. In an example embodiment, the wanted/unwanted human classification module 101D is rules based. In an example embodiment, the wanted/unwanted human classification module 101D is neural network or DNN based.

As shown in FIG. 5, the first block 502 includes the image instance segmentation module 101A and the head pose estimation module 101B. In an example embodiment, the image instance segmentation module 101A segments the digital image 402 and detects various object instances from the digital image 402, such as: human instances, non-human object instances (can be referred to as "other instances" for simplicity of reference), and optionally background instances. In an example embodiment, the image instance segmentation module 101A generates, from the digital image 402: 1. A list of object category labels, 2. A list of object scores, 3. A list of binary masks, 4. A list of object bounding boxes, and 5. A list of crowd instances (i.e., "is_crowd labels"). These lists can be collectively referred to as object instance lists 508. In an example, the list of object category labels can be restricted to human instances, other instances, and optionally background instances. The other instances can be labelled with a single category label that identifies all non-human object instances, which can reduce false positives.

In an example embodiment, the head pose estimation module 101B generates, from the digital image 402: 6. A list of human head bounding boxes (bounding box of each detected human head instance), and 7. A list of head poses for each human head bounding box (i.e., "yaws, pitches, and rolls"). These lists can be collectively referred to as human head instance lists 510.

The image modification system 100 can further include a head-human matching module 550 that matches the human head instances with the human instances (i.e., object instances having an object category label of human). The head-human matching module 550 generates the object instance lists 508 and the human head instance lists 510 with each of the human head instances matched with a respective one of the human instances. In an example, the human-head matching module 550 is rules-based. In another example, the human-head matching module 550 is executed by a trained human-head matching model.

In an example, the image instance segmentation module 101A is a trained image instance segmentation module, is illustrated in detail in FIG. 8. In an example, the head pose estimation module 101B is a trained head pose estimation module, illustrated in detail in FIG. 9.

At step 512, the image modification system 100 determines whether any of the category labels are human instances. If not ("No"), the image modification system 100 ends the image modification method at step 514.

If at least one of the category labels is a human instance ("Yes"), the image modification system 100 performs the second block 504. The second block 504 includes the wanted/unwanted human classification module 101D. The wanted/unwanted human classification module 101D generates the mask 406 for each respective human instance detected in the digital image 402. The wanted/unwanted human classification module 101D generates, from the object instance lists 508 and human head instance lists 510: a list of unwanted human instances to be inpainted, and a list of the wanted human instances to be maintained. From the list of unwanted human instances, the wanted/unwanted human classification module 101D generates: 1. A list of unwanted human masks 520 to be inpainted. From the list of wanted human instances, the wanted/unwanted human classification module 101D generates: 2. A list of wanted human masks 522 which are to be maintained. The human masks were originally generated in the "3. A list of binary masks" as found in the object instance lists 508. An example of the wanted/unwanted human classification module 101D is illustrated in detail in FIG. 10.

At step 516, the image modification system 100 determines whether there are any unwanted human instances to be inpainted. If not ("No"), the image modification system 100 ends the image modification method at step 518.

If there is at least one unwanted human instance ("Yes"), the list of unwanted human masks 520 is sent to the third block 506. In some examples, the list of wanted human masks 522 is also sent to the third block 506.

The third block 506 includes the image inpainting module 101C. The image inpainting module 101C receives the digital image 402, the list of unwanted human masks 520, and the list of wanted human masks 522 to be maintained. The image inpainting module 101C generates, from the list of unwanted human masks 520 and the digital image 402, the inpainted digital image 404. Therefore, the unwanted human instances are removed and inpainted in the inpainted digital image 404. In the present example, the first human 408 is maintained in the inpainted digital image 404.

In some examples, the image inpainting module 101C further uses the list of wanted human masks 522 to perform the inpainting. In some examples, the image inpainting module 101C further uses the object instance lists 508 and optionally the human head instance lists 510 to perform the inpainting. An example of the inpainting module 101C is further detailed in FIG. 11.

Figure 6:
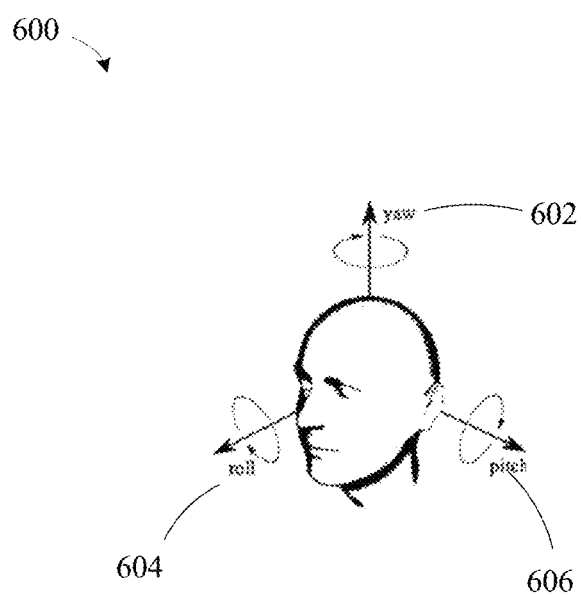
FIG. 6 is a pictorial representation of a head pose detected by the image modification system.

FIG. 6 is a pictorial representation of a head pose of a head instance 600 detected by the head pose estimation module 101B, in accordance with example embodiments. In particular, the respective head pose is generated from each human head bounding box. The respective head pose is then listed in "6. A list of human head bounding boxes" in FIG. 5. As shown in FIG. 6, the head pose can include head pose angles of yaw 602, pitch 604, and roll 606. Each head pose angle can be an angular value such as degrees, radian, or other suitable scale. In an example, positive angular values follow the left hand rule in relation to the respective axis. In some examples, at least one but not all of the particular head pose angles are detected. For example, in some instances only yaw 602 is detected by the head pose estimation module 101B for each human head instance (defined by each human head bounding box), and used by the image modification system 100.

Figure 7:
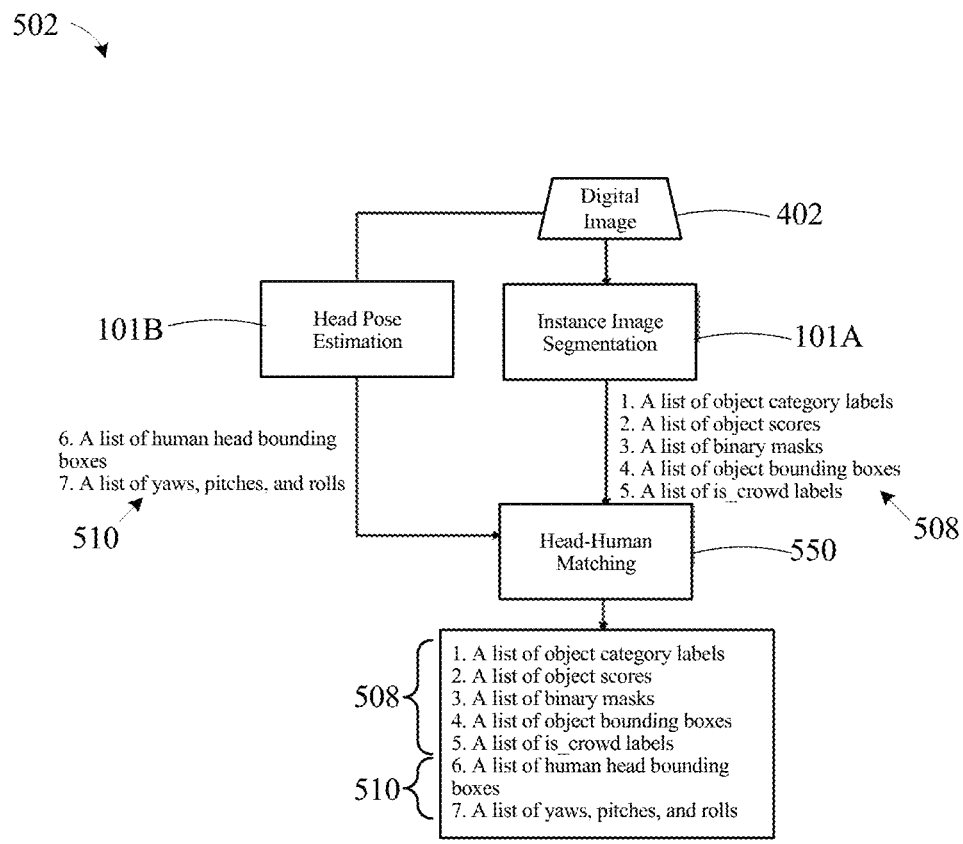
FIG. 7 is a detail flow diagram performed by a first module of the image modification system which includes an image instance segmentation module and a head pose estimation module, in accordance with an example embodiment.

FIG. 7 is a detail flow diagram for object segmentation and head pose estimation performed by the first block 502 of the image modification system 100 in accordance with an example embodiment. As in FIG. 5, the image instance segmentation module 101A generates, from the digital image 402: 1. A list of object category labels, 2. A list of object scores, 3. A list of binary masks, 4. A list of object bounding boxes, and 5. A list of crowd instances (i.e., "is_crowd labels"). These lists can be collectively referred to as object instance lists 508. The head pose estimation module 101B generates, from the digital image 402: 6. A list of human head bounding boxes (bounding box of each detected human head instance), and 7. A list of head poses for each human head bounding box (e.g., "yaws, pitches, and rolls"). These lists can be collectively referred to as human head instance lists 510.

The first block 502 can further include a head-human matching module 550 that matches the human head instances with the human instances (i.e., object instances having an object category label of human). The head-human matching module 550 generates the object instance lists 508 and the human head instance lists 510 with each of the human head instances matched with a respective one of the human instances.

FIG. 8 is a detail flow diagram for image instance segmentation performed by the image instance segmentation module 101A in accordance with an example embodiment. The image instance segmentation module 101A generates, from the digital image 402, the object instance lists 508.

Some differences between the image instance segmentation module 101A and conventional image instance segmentation models include: i) there being a crowd branch 806 and ii) all other non-human object categories all have the same object category label as other instances (or "others"). The merging of the non-human object categories into the same category reduces false positives of human categorization.

In FIG. 8, the image instance segmentation module 101A includes a convolution branch 802 which executes a CNN-based model configured to generate, from the digital image 402, object instances by way of the object classification labels ("class") and bounding box ("box"). In an example, the object instances are set to three classes: human, others, and background. The image instance segmentation module 101A includes a mask branch 804 configured to generate, from the digital image 402, a mask of each object detected by the convolution branch 802. The image instance segmentation module 101A includes a crowd branch 806 configured to generate, from the digital image 402, a flag as to whether a ROI contains a crowd of humans at least greater than a threshold, for example at least five humans.

A region proposals module 810 generates region proposals from the digital image 402, which are ROI of objects detected from the digital image 402. A ResNET backbone 812 generates feature maps from the digital image 402. An example of the ResNET backbone 812 is described in He et al., "Deep Residual Learning for Image Recognition," The IEEE Conference on Computer Vision and Pattern Recognition (CVPR), 2016, pp. 770-778, incorporated herein by reference. In an example, the ResNET backbone 812 implemented herein is Res5, which refers to a $5^{th}$ level bottleneck of the convolution layer structure of the ResNET backbone 812.

The ROI align module 814 uses pooling and align operations to generate (extract) ROI of detected objects in the digital image 402 using the region proposals and the feature maps. The convolution branch 802 includes convolution layers which generate convolved feature maps. The convolution branch 802 includes Global Average Pooling layer which averages the convolved feature maps spatially, i.e., along width/height, generating pooled feature maps. The convolution branch 802 includes Full Connected layer which generates, from the pooled feature maps, the object classification labels ("class", of N×3 dimension) and the bounding box ("box", of N×3×4 dimension) for each of the detected object instances. N is the number of detected ROIs. For each ROI, the class is a probability vector that includes a probability value for each of the three class noted (i.e., human, others, background). The class with the highest probability value is selected as the class for the object segmentation. Box outputs the ROI coordinate information, i.e. bounding box.

In the mask branch 804 of FIG. 8, a ROI align module 816 uses pooling and align operations to generate (extract) ROI of detected objects in the digital image 402 using the region proposals and the bounding box. The mask branch 804 includes convolution layers for generating convolved feature maps from the ROI of the ROI align module 816. The mask branch 804 also includes transpose convolution layers for generating deconvolved feature maps by deconvolving from the convolved feature maps, and the mask branch 804 also includes second convolution layers for generating second convolved feature maps from the deconvolved feature maps. A mask module 818 generates the mask of each detected object instance from the second convolved feature maps. The mask is a pixel region for each object instance where non-zero pixels contains the object instance. In an example, the mask is a boolean mask, e.g. 0s and 1s, or 0s and 255s, etc.

The crowd branch 806 receives the ROI from the ROI align module 816. A crowd is one of the detected objects (or ROI) of the digital image 402. The crowd branch 806 includes convolution layer with stride 1, convolution layer with stride 2, convolution layer with stride 1, and convolution layer with stride 1, to generate convolved feature maps. These are 4-layers 2D Convolution with kernel size 3×3 and rectified linear unit (ReLU) activation. The crowd branch 806 includes Global Average Pooling layer which averages the convolved feature maps spatially, i.e., along width/ height, generating pooled feature maps. The crowd branch 806 includes a full connected layer which generates (predicts) the Boolean flag of is_crowd for the ROI. The is_crowd flag is a Boolean variable reporting if the ROI contains a human crowd, e.g., at least five adjacent humans in the ROI.

The is_crowd flag for a ROI can be used to determine whether the digital image has a crowd or not. The is_crowd flag can be used by the image modification system 100 to make different decision if the crowd contains too many humans, i.e., leave the bounding box as un-inpainted when the crowd is at least greater than five humans, rather than inpainting the entire crowd when there are less than five humans.

The post-processing module 820 generates, from the information received from the convolution branch 802, the mask branch 804, and the crowd branch 806: 1. A list of object category labels, 2. A list of object scores, 3. A list of binary masks, 4. A list of object bounding boxes, 5. A list of is_crowd labels.

Therefore, for each detected object instance in the digital image, the image instance segmentation module 101A generates: object category label, object probability, object binary mask, and object bounding box.

Optionally, for each detected background instance in the digital image, the image instance segmentation module 101A generates: background category label, background probability, background binary mask, and background bounding box.

For training the DNN of the image instance segmentation module 101A, a labelled data sample includes an input (i.e., a digital image) and the output labels, which include a category of each object in the image (i.e., background, human and others), a mask for the object, a bounding box for the object (the ROI), and an is_crowd flag indicating whether the ROI contains a human crowd of greater than a threshold number (e.g., at least five adjacent people in the ROI).

FIG. 9 is a detail flow diagram for head pose estimation performed by the head pose estimation module 101B in accordance with an example embodiment. The head pose estimation module 101B generates, from the digital image 402, the human head instance lists 510 which include: 6. A list of human head bounding boxes (bounding box of each detected human head instance), and 7. A list of head poses for each human head bounding box (e.g., "yaws, pitches, and rolls"). The head pose estimation module 101B includes a head detection module 902, which includes a head detection model. The head pose estimation module 101B is configured to generate, from the digital image: 6. A list of human head bounding boxes. An example of the head detection module 902 uses Faster R-CNN (Ren et al., "Faster R-CNN: Towards real-time object detection with region proposal networks", Advances in Neural Information Processing Systems (NIPS), 2015, incorporated herein by reference). Other head detection modules or head detection models may be used in other examples. A crop module 906 generates, from the digital image 402 and the list of human head bounding boxes, a respective cropped image for each human head bounding box in the digital image 402. The dimension of each cropped image is the same dimension of the respective human head bounding box. The head pose estimation module 101B also includes an instance head pose estimator module 904, which generates the list of head poses for each cropped image containing each human head bounding box. The instance head pose estimator module 904 includes an instance head pose estimator model. The instance head pose estimator module 904 includes a ResNet Backbone 908, which is configured to generate feature maps from the cropped images. An example of the ResNet Backbone 908 is described in He et al., supra. The instance head pose estimator module 904 includes fully connected layers 910 which generate un-normalized vectors of respective yaw, pitch, and roll for each human head instance from the feature maps. The instance head pose estimator module 904 includes Softmax layers 912 which generates, from the un-normalized vectors, the respective yaw, pitch, and roll (now normalized vectors) for each human head instance of each human head bounding box in the digital image 402. An example of the instance head pose estimator module 904 is e.g., Ruiz et al., "Fine-Grained Head Pose Estimation Without Keypoints." The IEEE Conference on Computer Vision and Pattern Recognition (CVPR) Workshops, 2018, pp. 2074-2083, incorporated herein by reference). Other head pose estimators, modules or models may be used for the instance head pose estimator module 904 in other examples.

Note that there are two example variants for the head pose estimation module 101B: 1) cascaded head detection and head pose estimation 2) combined head detection and head pose estimation. FIG. 9 illustrates the first variant.

For training the DNN of the head pose estimation module 101B, a labelled data sample includes an input (i.e., a digital image) and output labels, which include a bounding box for at least one human head location and the three head pose angle labels, i.e., yaw, pitch and roll, of each human head location. If the image contains multiple heads, there are multiple bounding boxes and each bounding box has its own head pose angle labels.

FIG. 10 is a detail flow diagram performed by the wanted/unwanted human classification module 101D of the image modification system 100 for classifying unwanted humans versus wanted humans from the digital image 402, in accordance with an example embodiment. The wanted/unwanted human classification module 101D receives the object instance lists 508 and the human head instance lists 510. At step 1002, the wanted/unwanted human classification module 101D generates (identifies) the list of human instances from the list of object category labels. At step 1004, the wanted/unwanted human classification module 101D determines whether there is a main character M. If not ("No"), at step 1006 the wanted/unwanted human classification module 101D determines that there are no unwanted human instances. If there is a main character M ("Yes"), at step 1008 the wanted/unwanted human classification module 101D finds other main characters who are related to the main character M, and continues to do so for the list of human instances. At step 1010, the wanted/unwanted human classification module 101D determines whether there are any human instances left in the list. If not ("No"), then there are no unwanted human instances (step 1006). If there are human instances left in the list ("Yes"), the wanted/unwanted human classification module 101D generates a list of unwanted human instances 1012. The list of unwanted human instances 1012 contain the remaining human instances that are not main characters (wanted human instances). The wanted/unwanted human classification module 101D generates, from the list of unwanted human instances 1012, the list of unwanted human masks 520 which are the masks of the unwanted human instances in the list of unwanted human instances 1012 in the digital image 402.

Referring again to step 1004, the main character is detected as follows. The main character is a wanted human instance. The main character has is_complete is true and the highest main character relevance score, e.g., conceptually, the highest, centered, front head human has the most chance of being the main character. The main character relevance score is calculated using Equation 1:

$$P_{score} = \frac{P_h}{H} - P_c + \text{is\_front} \times \alpha \qquad (1)$$

where $\alpha$ is a configurable constant for controlling the weight of facial pose on the main character relevance score. Is_front is true if the head yaw angle ($\phi$) is less than a configurable threshold ($\phi_0$) as shown in Equation 2:

$$\text{Is\_front} = \phi < \phi_0 \qquad (2)$$

The equation to calculate is_complete is Equation 3:

$$\text{is\_complete} = \begin{cases} (x_1 - x_0) < \tau_1 \times W \\ x_0 \leq \tau_2 \text{ or } x_1 \geq \tau_3 \end{cases} \text{False if both met} \qquad (3)$$

where $\tau_1$, $\tau_2$, and $\tau_3$ are configurable constants that controls how tight or loose we want to control whether a human is cut off by image boundary.

The equation to calculate the human's centrality is Equation 4:

$$P_c = 2 \times \min(|x_0 - x_{ic}|, |x_1 - x_{ic}|)/W \qquad (4)$$

The human instance with the highest main character relevance score is designated as the main character.

Referring again to step 1008, the other main characters are detected as follows. The other main characters are also designated as wanted human instances. Finding other main characters related to the main character includes:

1) All persons in the same cluster (i.e., main cluster) as the main character. If any human's segmentation mask is overlapped with another human and their sizes are close (i.e., within a threshold $\beta$), they belong to the same cluster.

The equation to check two person sizes are comparable based on their height only and is configurable through thresholds, is in Equation (5):

$$\text{is\_comparable is True if } P_{h1} > K_0 \times P_{h2} \text{ and } P_{h1} < K_1 \times P_{h2} \qquad (5)$$

where $K_0$, $K_1$ are configurable constants, $P_{h1}$ and $P_{h2}$ are the person size for comparison.

A person size dependent dilation radius size when calculating mask overlapping is in Equation (6):

$$\text{dilation}_{size} = \max\left(\frac{\text{int}(p_{h1})}{\rho}, r\right) \qquad (6)$$

where $\rho$ is a configurable constant and $r$ is the default dilation size. If the dilated person mask is overlapped with another person's mask, they are overlapped.

2) Not in the main cluster, but is big and centered enough, the detailed equation is shown below in Equation 7:

$$P_h - P_c > T \text{ and } P_h > \theta \times M_h \text{ and is\_complete} \qquad (7)$$

3) Not in the main cluster, but the feet locates at the same level as the main character and is big enough (Equation 8):

$$P_h > P_h^* - M_h \times \mu_1 \text{ and } P_h > \mu_2 \times M_h \text{ and is\_complete} \qquad (8)$$

In Equation 8, T, $\theta$, $\mu_{1,2}$ are thresholds that used in different equations and $P_h^*$ is the height of the main character. As shown in Table 1, $M_h$ represents the height of all main characters and it's calculated using the equation below in Equation 9:

$$M_h = \max(\cup_{i=1}^n P_h^i) \qquad (9)$$

In some examples, after step 1008, a further check can be performed if the unwanted human masks 520 includes a ROI of a crowd at least greater than a threshold, e.g. at least five people (in_crowd=true). If in_crowd=true for a ROI or bounding box, that ROI is not inpainted because of most inpainting algorithms do not perform well with such a large crowd. Those human instances in the crowd (contained in the ROI) are classified as main characters that are to be maintained in the digital image 402.

In some examples, after the list of unwanted human masks 520 is generated, a further check can be performed. If the total inpainting mask is more than a threshold in term of image area percentile, i.e., $\kappa$%, do not perform inpainting to ensure high inpainting quality (most inpainting algorithms do not perform well with a big mask). $\kappa$% is computed by calculating a percentage of total image area of the respective object mask for each human instance that is to be removed from the digital image versus total image area of the digital image.

Note that the formulas in the wanted/unwanted human classification module 101D of FIG. 10 can be ruled-based, for detecting the main group of people that are most salient to human eyes. Many configurable constants are associated with these Equations (1) to (9). In some alternate examples, the parameters of the wanted/unwanted human classification module 101D can also be learned, in which the parameters are optimized for accuracy of unwanted human detection and/or inpainting performance using deep learning models using labelled data. For example, at least some of the configurable constants associated with these Equations (1) to (9) are learned using deep neural networks.

Figure 11:
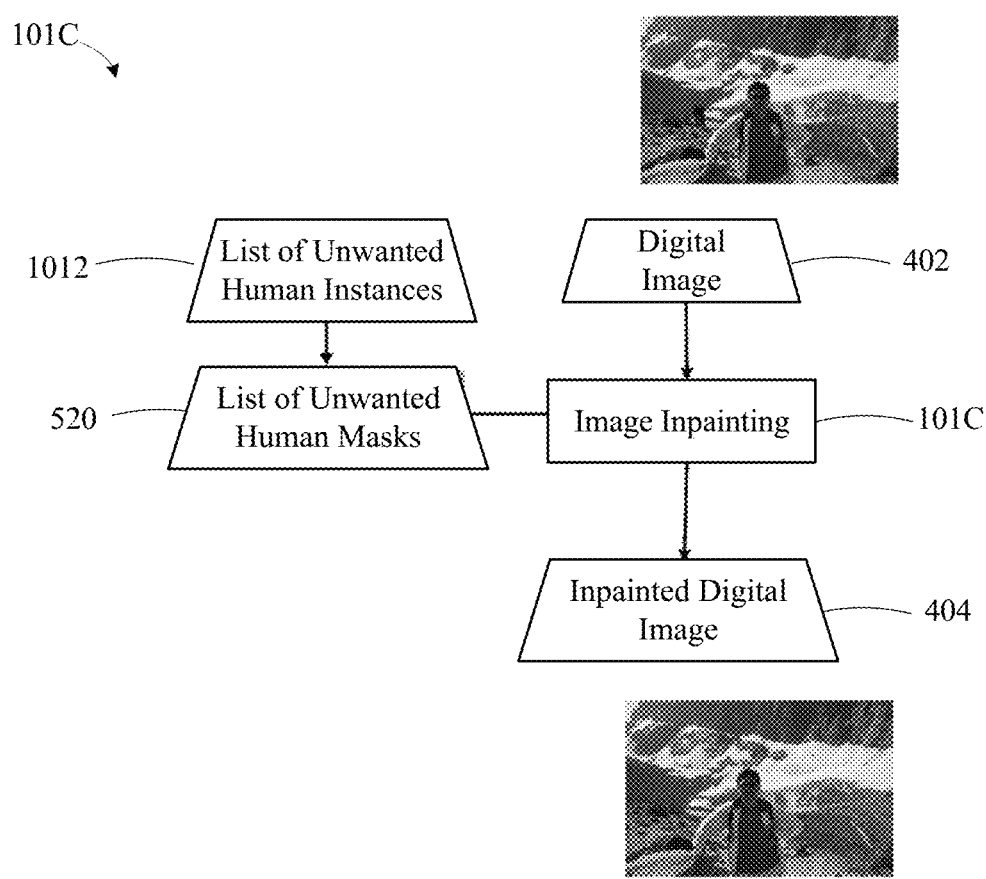
FIG. 11 is a flow diagram performed by an image inpainting module of the image modification system, in accordance with an example embodiment.

FIG. 11 is a detail flow diagram performed by the image inpainting module 101C in accordance with an example embodiment. As described above in FIG. 10, the wanted/unwanted human classification module 101D generates a list of unwanted human instances 1012 and a list of unwanted human masks 520 to be inpainted, which are the individual masks of the unwanted human instances. As shown in FIG. 11, the image inpainting module 101C generates, from a list of the unwanted human masks 520 to be inpainted, and the original digital image 402, the inpainted digital image 404. Specifically, the list of unwanted human instances 1012 are removed and inpainted in the inpainted digital image 404.

In the image inpainting module 101C, the image inpainting is performed using, for example, the inpainting method and system described in U.S. Patent Application No. 62/935,992 filed Nov. 15, 2019 entitled VERY HIGH-RESOLUTION IMAGE IN-PAINTING WITH NEURAL NETWORKS, the contents of which are incorporated herein by reference. In some examples, only the instance digital image 402 being input is used for the inpainting without using other digital images. In other words, the digital image 402 can be inpainted without reference to other images, panoramic scenes, or video frames.

It can be appreciated that the image modification system 100, once activated, can be performed by the processing unit(s) 111 in a fully-automatic manner, which is convenient for users to use as no manual interaction is needed.

It can be appreciated that the image modification system 100 can be used on unconstrained environments, objects (human and non-human) and scenarios. The image modification system 100 is flexible to cover different use cases and scenarios wherever photographs may be taken.

It can be appreciated that the image modification system 100 can be deployed on a smart phone having a resident camera.

In populous regions such as China, Japan, Indonesia, India, USA or Europe, people are typically densely distributed in regular public places, tourist destinations, beaches, resorts and theme parks. It is not easy to take a photograph without capturing distracting people. A user equipment such as a mobile phone can include the image modification system 100 that automatically removes unwanted or distracting people from the digital image after the photograph is taken.

It should be understood by a person skilled in the art that, for the purpose of convenient and brief description, for a detailed working process of the foregoing system, apparatus, and unit, refer to a corresponding process in the foregoing method embodiments, and details are not described herein again.

In the several embodiments described, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the example embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions may be implemented in a form of a software product. The software product is stored in a storage medium, and includes several instructions for instructing user equipment or a computer device to perform all or some of the steps of the methods described in the example embodiments. The foregoing storage medium includes any medium that can store program code, such as a Universal Serial Bus (USB) flash drive, a removable hard disk, a read-only memory (Read-Only Memory, ROM), a random access memory (Random Access Memory, RAM), a magnetic disk, or an optical disc.

The foregoing descriptions are merely specific implementations, but are not intended to limit the scope of protection. Any variation or replacement readily figured out by a person skilled in the art within the technical scope shall fall within the scope of protection. Therefore, the scope of protection shall be subject to the protection scope of the claims.

What is claimed is:

1. An image modification method, comprising:
   receiving a digital image;
   generating, using an image instance segmentation model, a list of at least one human instance detected in the digital image, a respective bounding box for each human instance, and a respective object mask defined by respective pixels for each human instance;
   generating, using a head detection model, a respective bounding box for each human head instance detected in the digital image;
   generating, using a head pose estimation model, a respective head pose for each human instance;
   classifying, using i) the list of at least one human instance, ii) the respective bounding box for each human instance, iii) the respective head pose for each human instance, the respective object mask for each human instance that is to be removed from the digital image versus the respective object mask for each human instance that is to be maintained in the digital image; and
   generating, using an inpainting model, an inpainted digital image from the digital image by inpainting the respective pixels of the respective classified object mask for each human instance that is to be removed.

2. The image modification method as claimed in claim 1, wherein the respective head pose for each human instance includes yaw, pitch, and roll.

3. The image modification method as claimed in claim 1, further comprising matching each human head instance to the human instance to which that human head instance belongs.

4. The image modification method as claimed in claim 1:
   further comprising generating, using the image instance segmentation model, for each human instance: object category label, and object probability.

5. The image modification method as claimed in claim 1 wherein, for each non-human object instance detected in the digital image, a same non-human object category label is used.

6. The image modification method as claimed in claim 1:
   further comprising generating, using the image instance segmentation model, a list of crowd instances contained in the digital image.

7. The image modification method as claimed in claim 1, wherein each crowd instance in the list of crowd instances contain at least a threshold number of human instances in a region of interest.

8. The image modification method as claimed in claim 1, wherein each crowd instance in the list of crowd instances define the respective masks of human instances that are to be maintained in the digital image.

9. The image modification method as claimed in claim 1, wherein the classifying each human instance that is to be maintained in the digital image includes detecting at least one human instance in the digital image that is overlapped in a cluster with the main human instance.

10. The image modification method as claimed in claim 1, wherein the classifying each human instance that is to be maintained in the digital image includes detecting at least two human instances in the digital image that are overlapped in a cluster exclusive of the main human instance and have a respective height within a threshold of the main human instance.

11. The image modification method as claimed in claim 1, wherein the classifying includes detecting at least one human instance in the digital image that has feet located at a same level as the main human instance and has a respective height within a threshold of the main human instance.

12. The image modification method as claimed in claim 1, further comprising computing a percentage of total image area of the respective object mask for each human instance that is to be removed from the digital image versus total image area of the digital image, and when the percentage exceeds a percentage threshold, refraining from performing the generating of the inpainted digital image.

13. The image modification method as claimed in claim 1, wherein the generating, using the inpainting model, includes using the digital image without any other digital images.

14. An image modification method, comprising:
receiving a digital image;
generating, using an image instance segmentation model, a list of at least one human instance detected in the digital image, a respective bounding box for each human instance, and a respective object mask defined by respective pixels for each human instance;
generating, using a head detection model, a respective bounding box for each human head instance detected in the digital image;
generating, using a head pose estimation model, a respective head pose for each human instance;
classifying, using i) the list of at least one human instance, ii) the respective bounding box for each human instance, iii) the respective head pose for each human instance, the respective object mask for each human instance that is to be removed from the digital image versus the respective object mask for each human instance that is to be maintained in the digital image;
generating, using an inpainting model, an inpainted digital image from the digital image by inpainting the respective pixels of the respective classified object mask for each human instance that is to be removed;
generating, using the image instance segmentation model, at least one non-human object instance detected in the digital image; and
generating, using the image instance segmentation model, for each non-human object instance: object category label, object probability, object binary mask, and object bounding box,
wherein the generating, using the inpainting model, uses the object category label, the object probability, the object binary mask, and the object bounding box.

15. An image modification method, comprising:
receiving a digital image;
generating, using an image instance segmentation model, a list of at least one human instance detected in the digital image, a respective bounding box for each human instance, and a respective object mask defined by respective pixels for each human instance;
generating, using a head detection model, a respective bounding box for each human head instance detected in the digital image;
generating, using a head pose estimation model, a respective head pose for each human instance;
classifying, using i) the list of at least one human instance, ii) the respective bounding box for each human instance, iii) the respective head pose for each human instance, the respective object mask for each human instance that is to be removed from the digital image versus the respective object mask for each human instance that is to be maintained in the digital image; and
generating, using an inpainting model, an inpainted digital image from the digital image by inpainting the respective pixels of the respective classified object mask for each human instance that is to be removed;
wherein the classifying each human instance that is to be maintained in the digital image includes detecting a main human instance in the digital image, wherein the main human instance is one of the human instances that is highest, centered, front facing and horizontally complete.

16. An image modification apparatus, comprising:
memory;
a processor configured to execute instructions stored in the memory, to:
receive a digital image,
generate, using an image instance segmentation model, a list of at least one human instance detected in the digital image, a respective bounding box for each human instance, and a respective object mask defined by respective pixels for each human instance,
generate, using a head detection model, a respective bounding box for each human head instance detected in the digital image,
generate, using a head pose estimation model, a respective head pose for each human instance,
classify, using i) the list of at least one human instance, ii) the respective bounding box for each human instance, iii) the respective head pose for each human instance, the respective object mask for each human instance that is to be removed from the digital image versus the respective object mask for each human instance that is to be maintained in the digital image, and
generate, using an inpainting model, an inpainted digital image from the digital image by inpainting the respective pixels of the respective classified object mask for each human instance that is to be removed.

17. The image modification apparatus as claimed in claim 16, wherein the processor is configured further configured to generate, using the image instance segmentation model, for each human instance: object category label, and object probability.

18. The image modification apparatus as claimed in claim 16, wherein the processor is configured further configured to generate, using the image instance segmentation model, at least one non-human object instance detected in the digital image, wherein the processor is configured further configured to generate, using the image instance segmentation model, for each non-human object instance: object category label, object probability, object binary mask, and object bounding box, and wherein the generating, using the inpainting model, uses the object category label, the object probability, the object binary mask, and the object bounding box.

19. The image modification apparatus as claimed in claim 16, wherein, for each non-human object instance detected in the digital image, a same non-human object category label is used.

* * * * *